Patented June 2, 1931

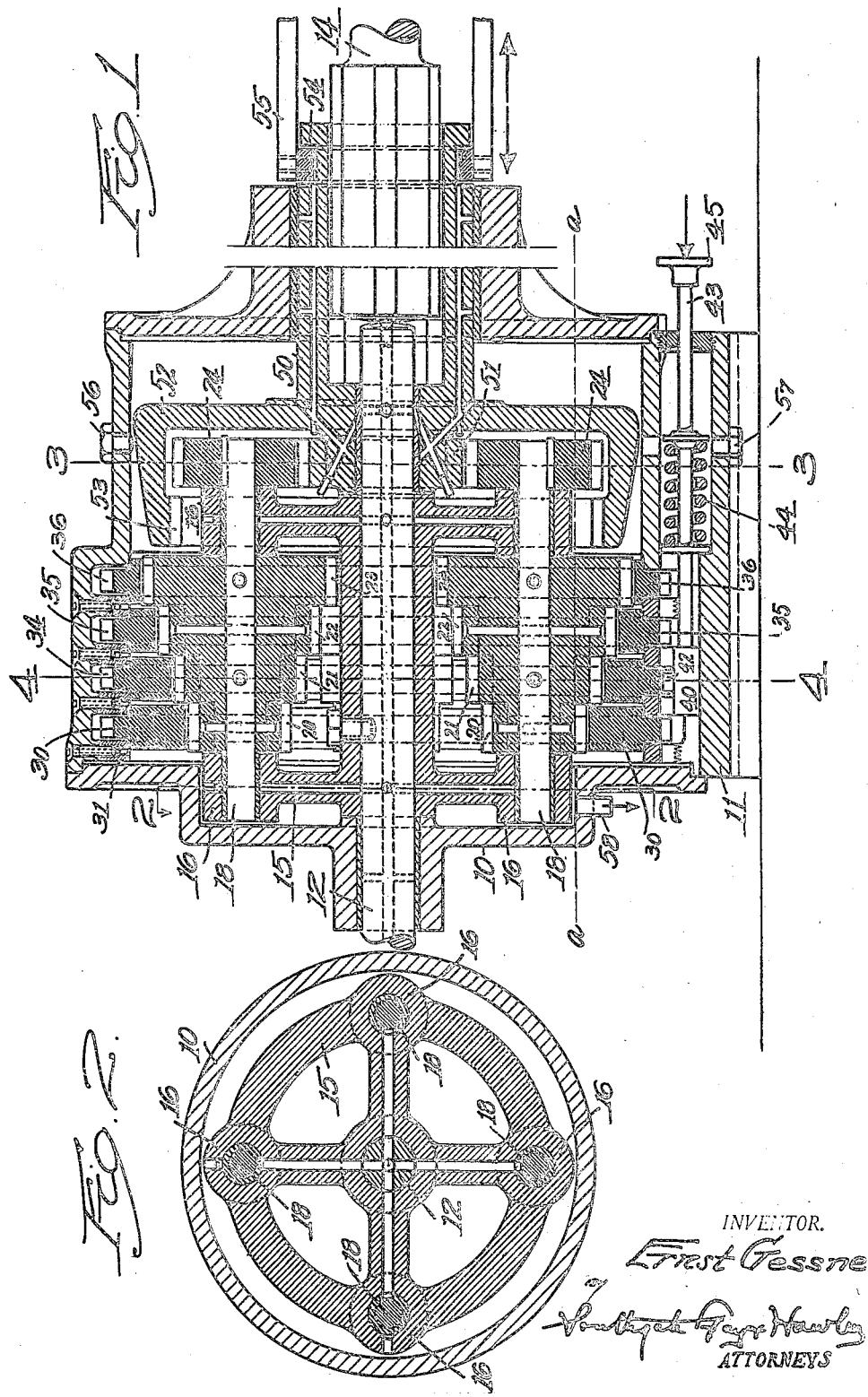

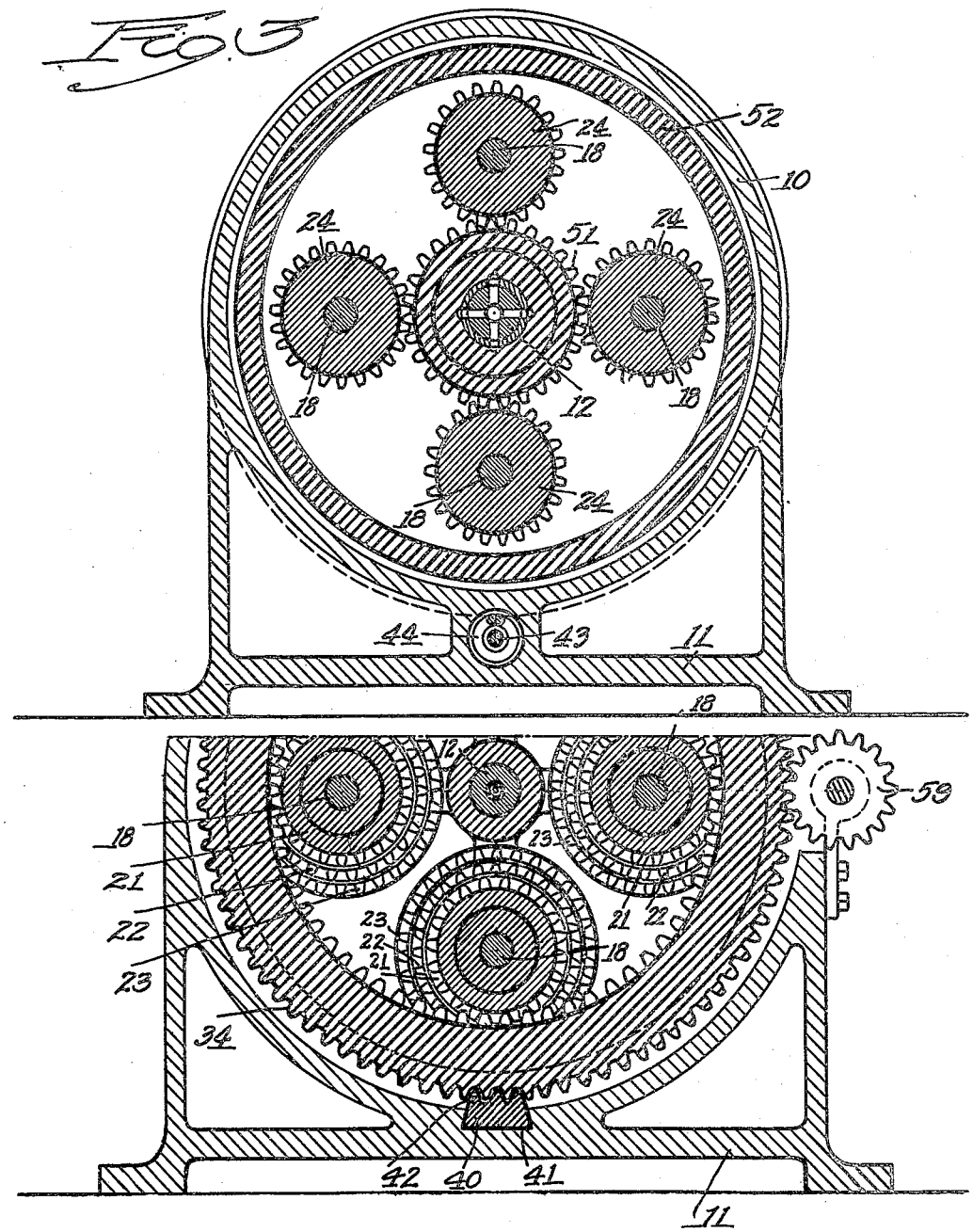

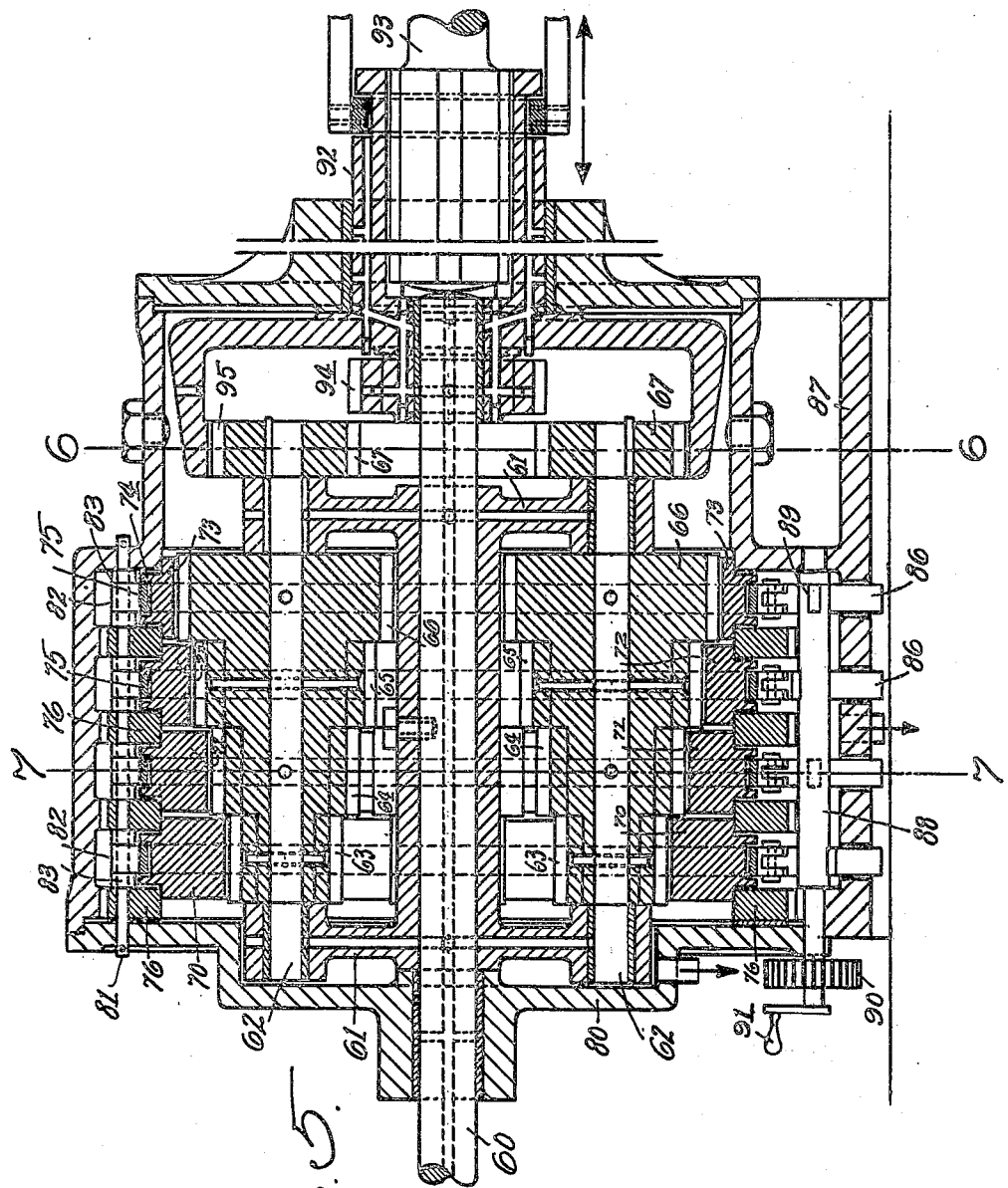

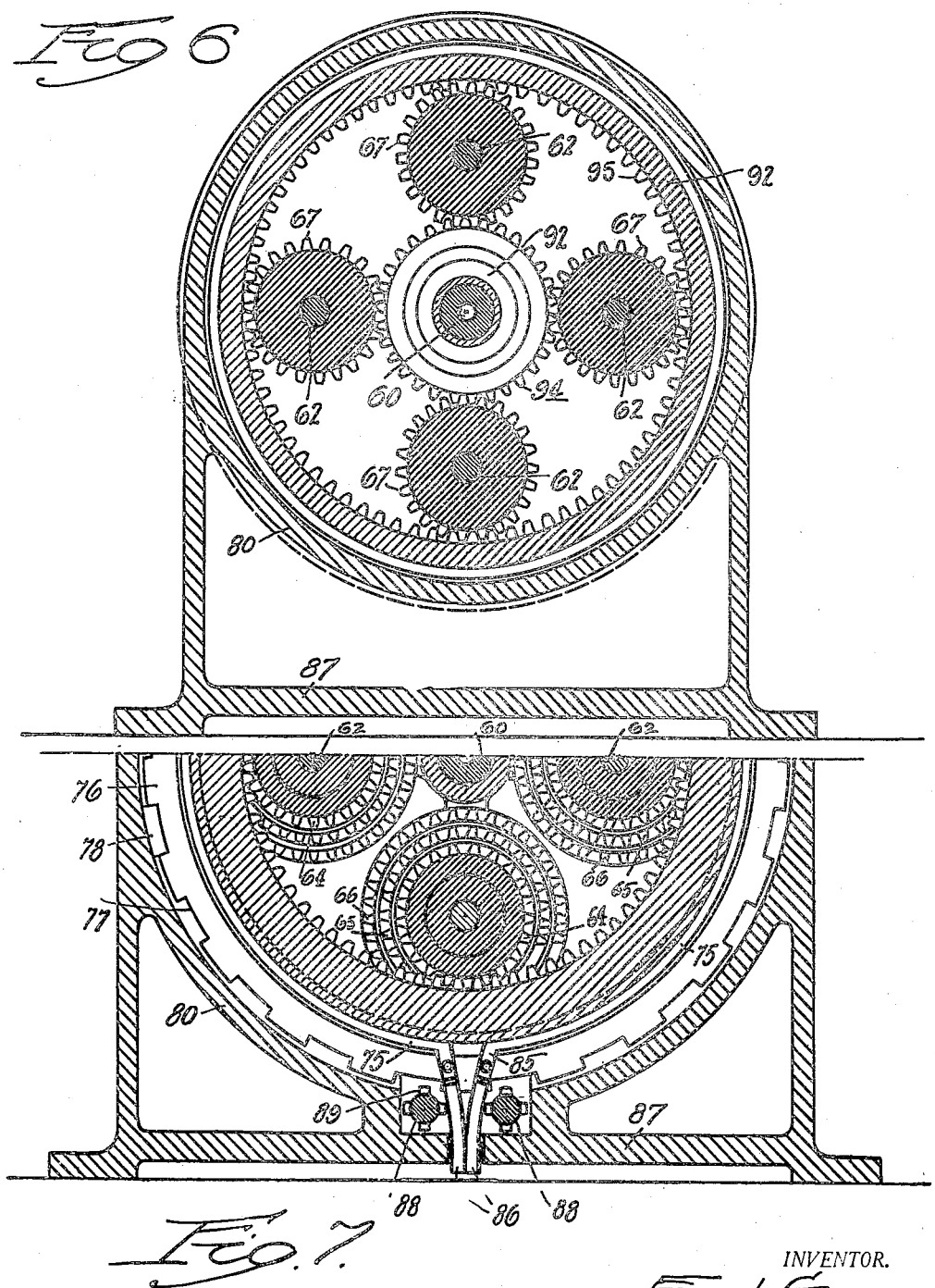

1,808,539

UNITED STATES PATENT OFFICE

ERNST GESSNER, OF WORCESTER, MASSACHUSETTS

SPEED CHANGING TRANSMISSION MECHANISM

Application filed January 31, 1930. Serial No. 424,963.

This invention relates to mechanism by which power may be transmitted from a driving to a driven member in selected speed ratios and by which the driven member may be positively brought to rest or may be reversed in direction of rotation.

It is the object of my present invention to provide improved mechanism by which a positive transmission of power is attained and by the use of which substantial units of power may be delivered at desired selected speeds.

My invention further relates to arrangements and combinations of parts which will be hereinafter described and more particularly pointed out in the appended claims.

Two forms of the invention are shown in the drawings, in which

Fig. 1 is a sectional side elevation of one form of my improved speed changing mechanism;

Figs. 2 and 3 are sectional end elevations, taken along the lines 2—2 and 3—3 in Fig. 1;

Fig. 4 is a partial sectional end elevation, taken along the line 4—4 in Fig. 1;

Fig. 5 is a sectional side elevation of a modified form of my invention;

Fig. 6 is a sectional end elevation, taken along the line 6—6 in Fig. 5; and

Fig. 7 is a partial end elevation, taken along the line 7—7 in Fig. 5.

Referring particularly to the form of my invention shown in Figs. 1 to 4, I have shown a casing 10 mounted on a suitable base 11 and providing bearings for a driving shaft 12 and a driven shaft 14. Power from any suitable source is applied to rotate the driving shaft 12 and the shaft 14 may be connected to supply power to any desired mechanism.

A double circular frame member 15 is mounted on the shaft 12 and provides a series of bearings 16 for a plurality of short shafts 18, disposed parallel to the driving shaft 12. Each of these shafts 18 has a series of spur gears 20, 21, 22 and 23 fixed thereon and rotatable therewith and each shaft also has an additional gear 24 fixed to the right hand end portion of the shaft, beyond the bearing, as viewed in Fig. 1. Four shafts 18 are shown in the drawings, but this number may be increased or decreased as is found desirable.

All of the gears 20 engage a ring gear 30 rotatable in bearing rings 31 and provided with both internal and external gear teeth. The sets of gears 21, 22 and 23 are similarly provided with ring gears 34, 35 and 36, and bearing rings 31 are provided between each pair of ring gears.

A block 40 is slidable in a dove-tailed guideway 41 (Fig. 4) in the base 11 and is provided with teeth 42 adapted to mesh with the teeth on the outside of the ring gears 30, 34, 35 or 36. The block 40 is controlled by a sliding plunger 43 and may be provided with a spring 44 by which the block will be automatically returned to inoperative position. This automatic return is desirable when the device is used in an automobile and the sliding block is actuated by a foot controlled pedal 45.

A sleeve 50 is keyed to the driven shaft 14 but is freely slidable thereon and is slidable and revolvable on the shaft 12 and at its inner end is provided with a spur gear 51 and with a flange 52 supporting an internal gear 53. The sleeve 50 has an annular groove 54 to receive a yoke member 55 by which it may be moved axially at the will of the operator.

By moving the sleeve 50 axially, the gears 24 on the ends of the shafts 18 may be caused to selectively engage the spur gear 51 or the large internal gear 53. A removable plug 56 is provided for filling the casing 10 with lubricant to a desired level and a plug 57 is provided for draining the same. An overflow pipe 58 may be provided to maintain the lubricant at the level of the line a—a in Fig. 1.

Assuming that the internal gear 53 is in mesh with the spur gears 24 and that power is applied to the driving shaft 12, the operation of the mechanism is as follows:—

The frame member 15 will be rotated with the driving shaft 12 and will carry with it the parallel shafts 18. If the ring gears 30, 34, 35 and 36 are all left free to rotate, the gears 24 will roll freely on the inside of the gear 53 and the ring gears 30, 34, 35 and 36 will stand still or will rotate idly at various speeds or directions.

If, however, the block 40 is moved to cause the teeth 42 to engage and lock one of the ring gears, a different action will take place. Assuming that the ring gear 30 is locked, the gears 20 will then be directly rotated about their axes as the member 15 rotates and this will produce a corresponding rotation of the gears which will drive the internal gear 53 and the sleeve 50, which in turn rotates the driven shaft 14.

Similar conditions will prevail if the block 40 is moved to lock one of the other ring gears 34, 35 or 36. It should be noted, however, that the gears 21 are shown equal in diameter to the gears 24 and that the ring gear 34 is of the same internal diameter as the internal gear 53. Accordingly, if the ring gear 34 is locked, and because the gears 21 and 24 always rotate at equal circumferential speed, the gears 24 will freely run on the gear 53 and in this case there is no transmission of speed or power to the sleeve 50 or to the shaft 14.

The gears 20 are of less diameter than the gears 24, while the gears 22 and 23 are of greater diameter. Consequently the gear 20 will cause rotation in one direction while the gears 22 and 23 will cause rotation at two different speeds in the opposite direction. Consequently, by moving the block 40 to lock a selected ring gear, the driven shaft may be rotated in one direction, may be held from rotation, or may be rotated at either one of two speeds in the opposite direction.

By moving the sleeve 50 to cause the gear 51 to engage the gears 24, four additional speeds, all in one direction, may be obtained, all of these speeds being greater than the speeds of the shaft 12.

The mechanism thus provides one reverse speed, one definite neutral position and six advance speeds by selectively positioning the sleeve 50 and the sliding block 40. Whenever any one of the ring gears 30, 34, 35 or 36 is held from rotation, the other ring gears are positively or negatively rotated at various speeds and obviously power could be taken therefrom by gears 59 (Fig. 4) meshing with the external teeth thereon.

When the internal gear 53 is in mesh with the gears 24, the locking of the ring gears 35 or 36 will cause the shaft 14 to be rotated in the direction of the shaft 12 but at a much lower speed. The shaft 14 revolves faster with the gear 36 locked than when 35 is locked.

When the spur gear 51 is in mesh with the gears 24 the shaft 14 is revolved in the same direction as the shaft 12, always at greater speed and with the speed increasing as the ring gears are locked in the order 36, 35, 34, 30.

Additional speed ratios may be obtained by positively rotating one of the ring gears by its external gear 59 instead of locking the gear.

While I have described the shaft 12 as the "driving" shaft and the shaft 14 as the "driven" shaft, it will be evident that these relations may be reversed and that under suitable conditions, power may be applied to the shaft 14 and taken from the shaft 12. The terms "driving" and "driven" are thus used for purposes of identification and not as positive operating limitations.

The construction shown in Figs. 5 to 7 is in general very similar to that previously described, but embodies the use of friction means for holding the ring gears from rotation.

A driving shaft 60 carries a frame member 61 supporting a plurality of angularly spaced parallel shafts 62 on which spur gears 63, 64, 65, 66 and 67 are secured. The gears 63, 64, 65 and 66 engage ring gears 70, 71, 72 and 73, each of which is provided with a groove or recess 74 in its outer periphery to receive a brake-band 75. Bearing rings 76 support the ring gears 70 to 73 and are preferably provided with notches 77 (Fig. 7) to receive lugs or projections 78 on the casing 80 by which they are held from rotation.

A cross pin 81 (Fig. 5) extends through the casing 80, the supporting rings 76 and through lugs 82 on the upper parts of the brake-bands 75, and thus retains all of these parts in assembled relation. Spacing collars 83 may be provided between the lugs 82 and the rings 76.

At their lower ends, each half of each brake-band is offset outwardly, as indicated at 85 in Fig. 7, and is pivotally connected to a yielding member 86 extending downward into a slot or opening in the base 87. Parallel shafts 88 are mounted in the base 87 and are provided with lugs 89 spaced axially of the shafts and each adapted to engage one of the yielding members 86. The shafts 88 are connected by gears 90 (Fig. 5) so that they may be rotated simultaneously to bring a pair of lugs 89 into engagement with a pair of yielding members 86 and thus apply the corresponding brake-band 75 to hold the associated ring gear from rotation. The wrench or handle 91 or any other suitable device may be provided for turning one of the shafts 88.

A sliding sleeve 92 is keyed to the driven shaft 93 and is provided with an external gear 94 and with an internal gear 95, positioned to selectively engage the gears 67 previously described, substantially as in the form of my invention disclosed in Figs. 1 to 4.

In the ordinary operation of the mechanism, power is applied to the shaft 60 and mechanism to be driven is connected to the shaft 93. Upon tightening a selected brake-band 75, selective speed relations may be established exactly as in the form previously described. This form of the invention is applicable to higher speeds of operation, as the brake-bands may be applied at speeds which would render the sliding block of the first form impractical or inoperative.

In connection with the use of the second ring gear 34 in Fig. 1 or 71 in Fig. 5 with the sliding ring gears positioned as in Fig. 5, it will be noted that the driven shaft 93 is not merely idle but is held positively from rotation.

By moving the sleeve 50 to a mid-position, the gears 51 and 53 may both be engaged with the gears 24 which will have the effect of locking the shafts 12 and 14 together in fixed relation. When thus adjusted, the transmission mechanism acts as a brake driving clutch.

Having thus described my invention and the advantages thereof, I do not wish to be limited to the details herein disclosed, otherwise than as set forth in the claims, but what I claim is:—

1. Speed changing transmission mechanism comprising a driving shaft, a driven shaft, a bearing frame rotatable with said driving shaft, a plurality of short shafts mounted in bearings in said frame and freely rotatable therein, a series of gears fixed on each short shaft, ring gears meshing therewith, gear connections from said short shafts to said driven shaft, and means to positively rotate a selected ring gear as said driving shaft is rotated.

2. Speed changing transmission mechanism comprising a driving shaft, a driven shaft, a bearing frame rotatable with said driving shaft, a plurality of short shafts mounted in bearings in said frame and freely rotatable therein, a series of gears fixed on each short shaft, ring gears meshing therewith, gear connections from said short shafts to said driven shaft, said ring gears having external gear teeth, and a sliding block movable to engage said teeth and selectively lock one of said ring gears, and a spring operatively engaging said block whereby to position said block in engagement with one of said ring gears so as to produce a non-driving relation between said shafts.

3. Speed changing transmission mechanism comprising a driving shaft, a driven shaft, a bearing frame rotatable with said driving shaft, a plurality of short shafts mounted in bearings in said frame and freely rotatable therein, a series of gears fixed on each short shaft, ring gears meshing therewith, gear connections from said short shafts to said driven shaft, and selective means to hold any one of said ring gears from rotation, said gear connection comprising additional gears mounted on said short shafts, a member slidable but non-rotatable relative to said driven shaft and an internal gear and an external gear both mounted on said sliding member and alternately engageable with said additional gears.

4. Speed changing transmission mechanism comprising a driving shaft, a driven shaft, a bearing frame rotatable with said driving shaft, a plurality of short shafts mounted in bearings in said frame and freely rotatable therein, a series of gears fixed on each short shaft, ring gears meshing therewith, gear connections from said short shafts to said driven shaft, and selective means to hold any one of said ring gears from rotation, said gear connection comprising additional gears on said short shafts, a member slidable but non-rotatable relative to said driven shaft, and an internal gear and an external gear both mounted on said sliding member and engageable with said additional gears to produce a unitary drive.

5. Speed changing transmission mechanism comprising a driving shaft, a driven shaft, a bearing frame rotatable with said driving shaft, a plurality of short shafts mounted in bearings in said frame and freely rotatable therein, a series of gears fixed on each short shaft, ring gears meshing therewith, gear connections from said short shafts to said driven shaft, and selective means to hold any one of said ring gears from rotation, and bearing rings separate from said ring gears located to rotatably support said ring gears and to hold the weight thereof free from the series gears engaged thereby and from said frame.

6. Speed changing transmission mechanism comprising a driving shaft, a driven shaft, a bearing frame rotatable with said driving shaft, a plurality of short shafts mounted in bearings in said frame and freely rotatable therein, a series of gears fixed on each short shaft, ring gears meshing therewith, gear connections from said short shafts to said driven shaft, and selective means to hold any one of said ring gears from rotation, said gear connections including a member slidable but non-rotatable on said driven shaft and carrying a plurality of gears adapted to be placed in operative engagement with said short shafts, one end of said driving shaft being rotatably supported in said sliding member.

7. A speed changing transmission mechanism comprising a driving shaft, a driven shaft and similar selective gear connections between said shafts by which a given rotation of said driving shaft in one direction may be caused to selectively rotate said driven shaft in one direction at a given speed or in the other direction at a selected one of a plurality of speeds, all of the driven speeds being substantially less than the driving shaft speed, and additional gear connections arranged to give additional speeds of said driven shaft in the direction of rotation of the driving shaft but higher than the speed of the driving shaft.

8. A speed changing transmission mechanism comprising a driving shaft, a driven shaft and similar selective gear connections between said shafts by which a given rotation of said driving shaft in one direction may be caused to selectively rotate said driven shaft in one direction at a given speed or in the other direction at a selected one of a plurality of speeds, and additional gear connections arranged to give additional speeds of said driven shaft in the direction of rotation of said driving shaft.

9. A speed changing transmission mechanism comprising a driving shaft, a driven shaft and similar selective gear connections between said shafts by which a given rotation of said driving shaft in one direction may be caused to selectively rotate said driven shaft in one direction at a given speed or in the other direction at a selected one of a plurality of speeds, or to positively hold said driven shaft from rotation, and means to provide additional speeds in the direction of rotation of said driving shaft.

10. Speed changing transmission mechanism comprising a driving shaft, a driven shaft, a bearing frame rotatable with said driving shaft, a plurality of short shafts mounted in bearings in said frame and freely rotatable therein, a series of gears fixed on each short shaft, ring gears meshing therewith, gear connections from said short shafts to said driven shaft, and selective means to hold any one of said ring gears from rotation, said gear connection comprising additional gears mounted on said short shafts, a member slidable but non-rotatable relative to said driven shaft and an internal gear and an external gear both mounted on said sliding member and engageable with said additional gears separately or simultaneously.

In testimony whereof I have hereunto affixed my signature.

ERNST GESSNER.